(12) United States Patent
Deschepper et al.

(10) Patent No.: US 12,201,129 B2
(45) Date of Patent: Jan. 21, 2025

(54) USE OF A COMPOSITION FOR IMPROVING SLAUGHTERING AND/OR MEAT QUALITY PARAMETERS

(71) Applicant: IMPEXTRACO NV, Heist-Op-Den-Berg (BE)

(72) Inventors: Katrien Deschepper, Heist-Op-Den-Berg (BE); Carles Giro-Manas, Heist-Op-Den-Berg (BE)

(73) Assignee: IMPEXTRACO NV, Heist-Op-Den-Berg (BE)

( * ) Notice: Subject to any disclaimer, the term of this patent is extended or adjusted under 35 U.S.C. 154(b) by 448 days.

(21) Appl. No.: 17/596,625

(22) PCT Filed: Jun. 17, 2020

(86) PCT No.: PCT/EP2020/066738
§ 371 (c)(1),
(2) Date: Dec. 15, 2021

(87) PCT Pub. No.: WO2020/254391
PCT Pub. Date: Dec. 24, 2020

(65) Prior Publication Data
US 2022/0095649 A1    Mar. 31, 2022

(30) Foreign Application Priority Data

Jun. 17, 2019    (BE) .................................. 2019/5388

(51) Int. Cl.
*A23K 20/111* (2016.01)
*A23K 50/10* (2016.01)
*A23K 50/30* (2016.01)
*A23K 50/80* (2016.01)

(52) U.S. Cl.
CPC ............ *A23K 20/111* (2016.05); *A23K 50/10* (2016.05); *A23K 50/30* (2016.05); *A23K 50/80* (2016.05)

(58) Field of Classification Search
None
See application file for complete search history.

(56) References Cited

U.S. PATENT DOCUMENTS

2017/0049134 A1    2/2017    Adam

FOREIGN PATENT DOCUMENTS

| CN | 106721006 A | 5/2017 |
| WO | 2016/051957 A1 | 4/2016 |
| WO | 2016/139188 A1 | 9/2016 |
| WO | 2020/254391 A1 | 12/2020 |

OTHER PUBLICATIONS

ISR-WO dated Aug. 7, 2020 for parent application PCT/EP2020/066738.
Paiva-Martins F et al, "The effect of olive leaves supplementation on the feed digestibility, growth performances of pigs and quality of pork meat", Aug. 1, 2009 (Aug. 1, 2009), vol. 82, No. 4, p. 438-443.

*Primary Examiner* — Lien T Tran
(74) *Attorney, Agent, or Firm* — Vorys, Sater, Seymour and Pease LLP

(57) ABSTRACT

The present invention concerns use of a composition as an additive in a feed for improving slaughtering and/or meat quality parameters of meat obtained from an animal to be consumed, wherein said composition comprises at least one polyphenolic compound.

14 Claims, No Drawings

USE OF A COMPOSITION FOR IMPROVING SLAUGHTERING AND/OR MEAT QUALITY PARAMETERS

FIELD OF THE INVENTION

The present invention pertains to use of a composition for improving slaughtering and/or meat quality parameters. In particular, the invention is directed to use of a polyphenolic composition as an additive in a feed.

BACKGROUND

At present, one of the biggest challenges for the food industry is to meet the vastly increasing demands not only regarding sufficient quantity, but regarding high quality standards as well. There is an ever increasing demand for healthy food products, which are of good quality, which are microbiologically safe, and which have a high nutritional value.

Especially in producing meat, finding an optimal balance between high production yield and high quality is very difficult. As a matter of fact, the concept of "meat quality" is of a very complex nature, comprising a multitude of characteristics: color, pH value, palatability, tenderness, water holding capacity etc. which are all closely interconnected.

Regarding production yield, polyphenols have been described e.g. in WO 2016/139188 regarding their ability to decrease growth retardation in animals. Equally, from WO 2016/051957 polyphenols are known to improve growth of pigs, thereby contributing to a higher production yield. However, meat quality is not discussed herein. Further disclosures regarding the use of polyphenolic compounds are US 2017/049134 relating to reduction of muscle contractions and rigor mortis after slaughter, and CN 106 721 006 disclosing the use of a tea polyphenol and vitamin E combination. Paiva-Martins F. et al. furthermore describes potential effects of olive leaves supplementation on feed digestibility and growth performance in pigs.

The present invention aims to resolve at least some of the problems and disadvantages mentioned above by adding a polyphenolic composition to an animal feed, mainly focusing on improvement of slaughtering and/or meat quality parameters.

SUMMARY OF THE INVENTION

The present invention relates to the use of a composition as an additive in a feed for improving slaughtering and/or meat quality parameters of meat obtained from an animal to be consumed according to claim 1. Said composition herein comprises at least one polyphenolic compound. The claimed use improves meat quality in parameters like tenderness and palatability, and improves carcass weight and composition.

A preferred embodiment is disclosed by claim 3. Herein, said at least one polyphenolic compound comprises free ortho di- or trihydroxy phenolic acids, ellagitannins, gallic esters, flavonoids, or combinations thereof.

Another preferred embodiment is disclosed by claim 12, wherein said animal is a pig, which is fed with said feed during the last 10 to 80 days before slaughter. This timeframe before slaughter has shown to be the most beneficial to use the polyphenolic composition of the present invention in improving meat quality and/or slaughtering parameters.

DETAILED DESCRIPTION OF THE INVENTION

The present invention concerns use of a composition as an additive in a feed for improving slaughtering and/or meat quality parameters of meat obtained from an animal to be consumed, wherein said composition comprises at least one polyphenolic compound Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

The expression "% by weight", "weight percent", "% wt." or "wt. %", here and throughout the description unless otherwise defined, refers to the relative weight of the respective component based on the overall weight of the formulation.

As disclosed herein, the wording "metric ton" or "MT" is used to indicate a weight equivalent to 1000 kg.

An "additive", or more in particular a "feed additive" is a component added to a regular feed of an animal, in particular to its solid feed or drinking water.

The term "animal" includes non-human animals such as animals belonging to the suidae, equidae, bovidae, birds (including chickens, ducks, quail and turkeys), fish and crustaceans (including crabs, lobsters, crayfish and shrimps).

A "feed", or more in particular an "animal feed" which is nutritionally complete typically comprises a blend of various feed components meeting the total daily requirements of carbohydrates, proteins and fats for the animal, i.e. the carbohydrates, proteins and fats are present in proportions and amounts such that at a regular intake the food meets said total daily requirements.

As disclosed herein, a "polyphenol" or "polyphenolic compound", also known as a polyhydroxyphenol, is a compound that belongs to the structural class of natural organic chemicals, typically derived from the shikimate/phenylpropanoid and/or the polyketide pathway, featuring one or more phenolic units and deprived of nitrogen-based functions, and its synthetic functional equivalents. By definition, the group of polyphenols consist of compounds that belong to either the flavonoids (isoflavones, flavones, flavonols, anthocyanins, flavanols, flavanones), or the non-flavonoid phenolic acids, stilbenes, lignans, saponins, tannins, phytosterols and their derivatives.

Regarding the present invention, the term "slaughtering parameters" is defined as a set of parameters which are related to slaughtering, as well as to an animal carcass which is obtained after slaughtering. Slaughtering parameters, among others, comprise warm carcass weight, carcass composition and ham parameters.

In this light, "improving" the warm carcass weight relates to an increase of the warm carcass weight, and "improving" ham parameters relates to larger ham dimensions (e.g. width), weight, or a smaller ham angle. The term "carcass composition" in the light of the present invention refers to the ratio of different tissues in an animal carcass, which comprises lean meat tissue, fat tissue and bone. As animals become older and heavier the proportion of fat in their carcasses increases and the proportion of muscles and bones decreases. Uncastrated male animals produce carcasses with more muscle than do castrated males. At a particular fat level the value of a carcass is influenced by the muscle/bone ratio. A higher ratio is obviously better since it equates to more saleable lean meat as well as better carcass conformation. In this light, the term "improving" thus relates to an increase of the muscle bone/ratio. For ruminants for example, beef breeds have a higher ratio than dairy breeds and entire males have a higher ratio than castrates. Regarding meat quality, a high lean meat/fat ratio is desired. "Lean meat content" is generally expressed in percentages, while "fat content" can be expressed in percentages as well as in "back fat thickness". This is especially relevant for pigs.

The term "meat quality parameters" refers to parameters of meat which are determined after slaughter of the animal. They comprise, though are not limited to, tenderness, flavor, oxidation level, oxidation resistance, drip loss, lean meat content, fat content, pigmentation and ultimate pH.

"Tenderness" is a quality of meat gauging how easily it is chewed or cut. Consequently, tenderness is a desirable quality, as tender meat is softer, easier to chew, and generally more palatable than harder meat. As a result, tender cuts of meat typically command higher prices. The tenderness depends on a number of factors including the meat grain, the amount of connective tissue, and the amount of fat and shows to be vastly improved be using the composition of the present invention as a feed additive for an animal to be consumed.

"Drip loss" is the moisture that forms and is released during this process potentially leaves the carcass. The more moisture remains in the flesh, the more tender the meat will be. Drip loss is thus a measure for the water-holding capacity of meat. The higher the drip loss the higher the economic loss. The method of choice to quantify drip loss in is the EZ-method. In this light, "improving" drip loss thus relates to a decrease in drip loss, thereby achieving a higher water-holding capacity of the meat.

"Oxidation" causes meat to undergo detrimental changes in pigmentation. Hence, it is very important that the initial color is preserved over time. The smaller the oxidation, the more preserved the color has been. Thiobarbituric acid reactive substances (TBARS) are a valuable measure of the degree of oxidation in meat and fat tissues. "Oxidation level" refers to the amount of oxidation that has already occurred in a meat product, wherein the occurred oxidation is expressed as a $\Delta$TBARS value. Thus, "improving" according to the present invention relates to a decrease of the $\Delta$TBARS value.

"Oxidation resistance" refers to the ability to withstand oxidation and is closely related to active antioxidant mechanisms. Reactive oxygen species (ROS) key in oxidation processes, and need to be counteracted in order to reduce oxidation. There are three major markers related to said resistance: (1) "superoxide dismutase" (SOD), (2) "glutathione peroxidase" (GPx), and (3) the ratio of "reduced to oxidized glutathione" (GSH/GSSH). An "improvement" in oxidation resistance thus relates to higher content of any of the herein described markers.

"Pigmentation" refers to the color of meat and can be objectively measured using the "Commission Internationale de l'Eclairage (CIE) L*a*b* scales" which is expressed as a $\Delta$E value. A lower value generally indicates an "improvement" according to the present invention.

"Ultimate pH" relates to the conversion of muscle to meat, i.e. how the glycogen reserve is transformed into lactic acid, and is an indication of tenderness as well as other meat quality parameters. An "improvement" according to the present invention thus relates to an increase in ultimate pH.

The use of a composition of the present invention has the advantage that animals grow faster and as a result, meat production yield will be improved as well. An additional advantage of the present use allows improvement of slaughtering and/or meat quality parameters. Generally, the meat quality of meat obtained from fast growing animals will show a large amount of water loss and will therefore be of a lesser quality than meat obtained from more slowly fattened animals. The composition of the present invention provides a solution and allows the faster fattening of animals, meanwhile preserving or even improving slaughtering and/or meat quality parameters. In fact, a particular advantage of the present invention exists in the fact that the present use allows for an increase in warm carcass weight that is relatively higher than the alive body weight gain. As a result, the efficiency of meat production is largely enhanced by the use according to the present invention.

By preference, said at least one polyphenolic compound is a plant polyphenol. A "plant polyphenol" according to the present disclosure is a natural polyphenol obtained from a plant. More than 8000 polyphenolic compounds have been identified in various plant species. All plant phenolic compounds arise from a common intermediate, phenylalanine, or a close precursor, shikimic acid. Primarily they occur in conjugated forms, with one or more sugar residues linked to hydroxyl groups, although direct linkages of the sugar (polysaccharide or monosaccharide) to an aromatic carbon also exist. Association with other compounds, like carboxylic and organic acids, amines, lipids and linkage with other phenol groups is also common. Using plant polyphenols has the regulatory advantage that the additive used in an animal feed requires less labeling compared to potentially harmful synthetic additives. Moreover, plant polyphenols are easily obtained from natural extracts.

More by preference, at least 90.0 wt. % of said polyphenolic compound is a plant polyphenol, even more by preference, at least 95.0 wt. % of said polyphenolic compound is a plant polyphenol, most by preference, at least 99.0 wt. % of said polyphenolic compound is a plant polyphenol.

A further or another embodiment of the present invention concerns said at least one polyphenolic compound comprising free ortho di- or trihydroxy phenolic acids, ellagitannins, gallic esters, flavonoids, or combinations thereof. The term "phenolic acid", in contrast to "benzoic acid", comprises a benzene ring and a carboxylic group, wherein said carboxylic group might, or might not be directly coupled to the benzene ring. The term "free" herein defines that the carboxylic acid functionality of the ortho di- or trihydroxy phenolic acids is not linked to any other molecule via a covalent bond. In the light of the present invention, "ellagitannins" are compounds based on an ellagic acid structure, i.e. a dilactone of hexahydroxydiphenic acid. They can among others be obtained from blackberries, strawberries, raspberries, pomegranates, nuts like gallnuts and walnuts, or Fagaceae species.

"Gallic esters" in the context of the present invention must be interpreted as esters of gallic acid and can among others be obtained from mango, nuts like gallnuts and walnuts, tea, or Fagaceae species.

"Flavonoids" are a class of plant and fungus secondary metabolites, which have the general structure of a 15-carbon skeleton, which consists of two phenyl rings and a heterocyclic ring. According to the present invention, flavonoids comprise flavones, flavonols, flavandiol, anthocyanins, condensed tannins, aurones, flavanones, dihydroflavones, or combinations thereof.

Use of said composition has the advantage of having a particularly beneficial effect towards slaughtering parameters and/or meat quality parameters, i.e. carcass composition, lean meat content and tenderness. Moreover, as a result of the use of said composition, the increase in warm carcass weight was further improved in comparison to the general alive weight gain, which contributes to a further improvement in meat production efficiency.

Said polyphenolic compound, according to some embodiments, has a content in said composition of between 5.0 and 95.0 wt. %. Within said range, the polyphenolic compound is optimally expressing its effect towards improving slaughtering and/or meat quality parameters, while other additional compounds can further be added. Such additional compounds potentially comprise stabilizers, thereby improving the stability of the composition, both on its own as well as added to an animal feed. By preference, said polyphenolic compound has a content in said composition of between 5.0 and 90.0 wt. %, more by preference of between 15.0 and 75.0 wt. %, even more by preference of between 20.0 and 65.0 wt. %. More by preference, said polyphenolic compound has a content of between 20.0 and 50.0 wt. %.

According to a further or another embodiment, said polyphenolic compound comprises free ortho di- or trihydroxy phenolic acids, wherein said free ortho di- or trihydroxy phenolic acids have a concentration in said composition of between 0.1 and 80.0 wt. %. Within said range a balance is obtained between enhancing meat production yield and obtaining a significantly higher quality of the meat, including improved tenderness and palatability.

By preference, said free ortho di- or trihydroxy phenolic acids have a concentration in said composition of between 1.0 and 50.0 wt. %, more by preference between 2.0 and 30.0 wt. %.

According to some embodiments, said polyphenolic compound comprises free ortho di- or trihydroxy phenolic acids and ellagitannins, wherein said free ortho di- or trihydroxy phenolic acids and said ellagitannins are present in said composition in a ratio of between 50:1 and 1:50. Said ratio of free ortho di- or trihydroxy phenolic acids and ellagitannins further improves the quantity/quality balance of the resulting meat products. Tenderness is further improved, which is expressed by a further reduction in drip loss.

By preference, said free ortho di- or trihydroxy phenolic acids and said ellagitannins are present in said composition in a ratio of between 1:1 and 1:25, more by preference of between 1:5 and 1:15.

In some embodiments, said polyphenolic composition comprises gallic esters and flavonoids, wherein said gallic esters and said flavonoids are present in said composition in a ratio of between 50:1 and 1:50. Within said range, the composition is further enhanced, leading to improved pigmentation characteristics of the obtained meat. "Improved pigmentation characteristics" should herein be interpreted differently in view of specific animal species. For example, beef should ideally have a bright cherry red color, while pork meat has a greyish pink color. Use according to the present invention provides optimal pigmentation characteristics to a variety of meat products.

According to a further or another embodiment, said free ortho di- or trihydroxy phenolic acids are chosen from the group of caffeic acid, rosemarinic acid, carnosic acid, ellagic acid, gallic acid, or combinations thereof.

In some embodiments, said composition is dosed in said feed in a concentration of between 0.05 and 1.40 kg/MT of feed. Generally, low dosages of polyphenols are used when general weight gain is targeted. In the present disclosure however, higher dosages are applied, as an optimal effect towards the improvement of slaughter and/or meat quality parameters is thereby obtained. By preference, said composition is dosed in said feed in a concentration of between 0.10 and 1.30 kg/MT of feed. More by preference, said composition is dosed in said feed in a concentration of between 0.75 and 1.20 kg/MT of feed.

In some embodiments, said animal is chosen from the group of pigs, ruminants, crustaceae, fish, or combinations thereof. Said animals are chosen as target animals, because, as of today, these animals still have a lot of room for improvement in product yield, slaughtering, as well as in meat quality. The use of a composition of the present invention therefore shows remarkable results in said animals and vastly improves the efficiency of meat production and improves a variety of slaughtering and/or meat quality characteristics. By preference, said animal is a pig.

Even more be preference, said pig is fed with said feed during the last 10 to 80 days before slaughter. Within this timeframe, the use of a composition of the present invention has relatively the largest effect on slaughtering and/or meat quality parameters like warm carcass weight, carcass composition, tenderness, drip loss and/or palatability, in comparison to the alive weight gain it induces. Furthermore, as the additive is only used during the final life stages of the animal, use of said additive has a very high return in investment. Even more by preference, said pig is fed with said feed during the last 40 to 75 days before slaughter, thereby further improving economic efficiency. Even more by preference, said pig is fed with said feed during the last 40 to 70 days, even more by preference during the last 40 to 65 days before slaughter.

In some embodiments, said pig has a body weight of between 70 and 160 kg. Within this body weight range, pigs are in their final fattening stage, where warm carcass weight is relatively even more increased in comparison to alive weight gain by using a composition according to the present invention as an additive in an animal feed. Using the additive in the most efficient weight range allows for a further improvement of both economic and general efficiency. By preference said pig has a body weight of between 75 and 140 kg, more by preference between 80 and 120 kg.

In any of the previous embodiments, said slaughtering parameters comprise warm carcass weight and/or carcass composition and/or ham parameters (weight and/or angle). By preference both of said slaughtering parameters are improved by use of a polyphenolic composition according to the present invention.

In any of the previous embodiments, said meat quality parameters comprise tenderness, flavor, oxidation level, oxidation resistance, drip loss, lean meat content, fat content, pigmentation, ultimate pH, or combinations thereof.

As described herein, improvement of any of said parameters comprises the obtained meat to be more tender, more palatable, to have a lower level of oxidation (which is expressed by a lower TBARS value), to have a higher resistance to oxidation (which is expressed in lower SOD, GPx and GSH/GSSH values), to show a vastly decreased drip loss, to have a higher ratio of lean meat to fat tissue, to have a more stable pigmentation over time, and/or to have an ultimate pH which is within the desired range for tender meat, i.e. between 5.4 and 5.8.

According to some embodiments, use of the polyphenolic compound of the present invention was found to improve at least two of the above-mentioned slaughtering and/or meat quality parameters. By preference, at least three parameters are improved. More by preference, at least four parameters are improved. Even more by preference, at least five of the above-mentioned parameters are improved.

EXAMPLES

The invention is further described by the following non-limiting examples which further illustrate the invention, and are not intended to, nor should they be interpreted to, limit the scope of the invention.

Example 1 Polyphenolic Composition A

A polyphenolic composition according to the present invention is shown in the table below.

| compound | concentration (wt. %) |
| --- | --- |
| polyphenols | 21.0 |
| free ortho di- or trihydroxy phenolic acids | 2.0 |
| ellagitannins | 14.0 |
| gallic esters | 3.0 |
| flavonoids | 2.0 |
| other compounds | 79.0 |

Use of said composition as an additive in a feed for improving meat quality parameters is further illustrated in examples 3 to 8.

Example 2 Polyphenolic Composition B

A high concentration polyphenolic composition according to the present invention is shown in the table below.

| Compound | concentration (wt. %) |
| --- | --- |
| Polyphenols | 73.0 |
| free ortho di- or trihydroxy phenolic acids | 6.0 |
| ellagitannins | 20.0 |
| gallic esters | 40.0 |
| flavonoids | 7.0 |
| other compounds | 27.0 |

Use of said composition as an additive in a feed for improving meat quality parameters is further illustrated in examples 3 to 9.

Example 3 Pig Feeding Trial with Composition a (Example 1)

A population of 96 pigs, comprising equal amounts of male and female specimen, was selected on a commercial fattening pig farm, and was fed with an animal feed comprising a composition according to the present invention, wherein said composition was dosed in the feed at a concentration of 1.00 kg/MT of feed. The feed was fed to the pigs once they reached a weight of above 85 kg which equals the last 40 days before they were slaughtered.

All animals were transported and slaughtered together to guarantee the same level of stress had accounted for both treatments. Animals were identified individually to enable tracking during the slaughterline.

Comparison was made between meat obtained from pigs being fed a feed comprising a composition of the present invention and meat obtained from pigs being fed a feed without additives.

| | no additive | additive |
| --- | --- | --- |
| average warm carcass weight (kg)* | 100.40 | 104.30 |
| angle of the ham (°)* | 56.61 | 54.00 |
| width of the ham (mm)* | 197.63 | 202.01 |
| weight of the ham (kg)* | 11.19 | 11.70 |

*significant difference ($p < 0.05$)

From this comparison study, it was concluded that the average warm carcass weight of said pigs was higher for the additive fed group compared to the control group. Furthermore, a larger amount of meat, both in dimensions and weight, was obtained from said group in comparison to the control group. Ham of the additive fed group was moreover found to be more tender in comparison to ham of the control group, and was found to have a better pigmentation.

Example 4 Pig Feeding Trial with Composition B (Example 2)

A population of 280 pigs, comprising equal amounts of male and female specimen, was selected on a commercial fattening pig farm, and was fed with an animal feed comprising a high concentration composition according to the present invention, wherein said composition was dosed in the feed at a concentration of 0.3 kg/MT of feed. The feed was fed to the pigs once they reached a weight of above 75.0 kg which equals the last 60 days before they were slaughtered.

All animals were transported and slaughtered together to guarantee the same level of stress had accounted for both treatments. Animals were identified individually to enable tracking during the slaughterline. Meat samples were taken 24 h after slaughter.

Comparison was made between meat obtained from pigs being fed a feed comprising a composition of the present invention and meat obtained from pigs being fed a feed without additives.

| | no additive | additive |
| --- | --- | --- |
| average warm carcass weight (kg)* | 104.00 | 110.00 |
| angle of the ham (°)* | 56.54 | 54.06 |
| width of the ham (mm)* | 197.84 | 201.09 |
| weight of the ham (kg) | 11.23 | 11.61 |

*significant difference ($p < 0.05$)

From this comparison study, it was concluded that the average warm carcass weight of said pigs was higher for the additive fed group compared to the control group. Furthermore, a larger amount of meat, both in dimensions and weight, was obtained from said group in comparison to the control group. Ham of the additive fed group was moreover found to be more tender in comparison to ham of the control group, and was found to have a better pigmentation.

Example 5 Pig Feeding Trial with Composition a (Example 1)

A population of 12 pigs, comprising all female specimen, was selected on a commercial fattening pig farm, and was fed with an animal feed comprising a composition according to the present invention, wherein said composition was dosed in the feed at a concentration of 1.40 kg/MT of feed. The feed was fed to the pigs once they reached a weight of above 79.0 kg which equals the last 35 days before they were slaughtered.

All animals were transported and slaughtered together to guarantee the same level of stress had accounted for both treatments. Information on carcass yield were derived from an AutoFOM III scanner in the slaughterline. Ultrasound sensors emit ultrasonic vibrations, wherein fat, meat and bone content can be distinguished. Animals were identified individually to enable tracking during the slaughterline. Meat samples were taken 24 h after slaughter.

Carcasses hang cool overnight in order for the meat to stiffen (i.e. a kind of rigor mortis) and to become more tender again. During this process, there are found a variety of changes taking place in the cells of the muscle and to the cross-link (consisting of collagen) between the muscle tissues. The moisture that forms and is released during this process potentially leaves the carcass, which is called "drip loss". The more moisture remains in the flesh, the more tender the meat will be. Drip loss is thus a measure for the water-holding capacity of meat. The higher the drip loss the higher the economic loss. The method of choice to quantify drip loss in this trial was the EZ-method, which allows a reliable high throughput screening of numerous samples at once.

Comparison was made between meat obtained from pigs being fed a feed comprising a composition of the present invention and meat obtained from pigs being fed a feed without additives.

|  | no additive | additive |
|---|---|---|
| average warm carcass weight (kg)* | 91.00 | 95.10 |
| lean meat (%) | 65.2 | 65.5 |
| back fat thickness (mm) | 6.75 | 5.45 |
| drip loss (%)* | 6.00 | 3.75 |

*significant difference ($p < 0.05$)

From this comparison study, it was concluded that the average warm carcass weight of said pigs was higher for the additive fed group compared to the control group. Furthermore, a larger amount of meat, both in dimensions and weight, was obtained from said group in comparison to the control group. Ham of the additive fed group was more tender in comparison to ham of the control group. This was supported by a significant reduction in drip loss of the additive fed group in comparison to the control group.

Example 6 Ruminant Feeding Trial with Composition a (Example 1)

A population of 12 cows was selected and was fed with an animal feed comprising a composition according to the present invention, wherein said composition was dosed in the feed at a concentration of 1.30 kg/MT of feed. The feed was fed to the cows once they reached a weight of above 380.0 kg which equals the last 100 days before they were slaughtered.

All animals were transported and slaughtered together to guarantee the same level of stress had accounted for both treatments. Information on carcass yield were derived from an AutoFOM III scanner in the slaughterline. Ultrasound sensors emit ultrasonic vibrations, wherein fat, meat and bone content can be distinguished. Animals were identified individually to enable tracking during the slaughterline. Meat samples were taken 24 h after slaughter.

Comparison was made between meat obtained from cows being fed a feed comprising a composition of the present invention and meat obtained from cows being fed a feed without additives.

|  | no additive | additive |
|---|---|---|
| average warm carcass weight (kg) | 450.10 | 462.20 |
| lean meat (%) | 52.3 | 54.2 |
| fat (%) | 35.0 | 32.2 |

From this comparison study, it was concluded that the average warm carcass weight of said cows was higher for the additive fed group compared to the control group. Furthermore, a larger amount of meat, comprising relatively more lean meat and less fat, was obtained from said group in comparison to the control group. Beef of the additive fed group was moreover found to be more tender and had a better pigmentation in comparison to beef of the control group.

Example 7 Tilapia Feeding Trial with Composition B (Example 2)

A population of 360 tilapia fish weighing between 450 and 700 g was selected and was fed with an animal feed comprising a high concentration composition according to the present invention, wherein said composition was dosed in the feed at a concentration of 0.250 kg/MT of feed.

The fish meat quality indicators evaluated were water-holding capacity (WHC), water loss by pressure and water loss during cooking. Analyses of water loss by pressure and water loss during cooking were performed in chilled samples, while the WHC was determined using frozen fillets.

Analysis of the water holding capacity (WHC) was performed on ten fillets per treatment as proposed by Lankhmanan et al. (2007). Water loss during cooking was determined according to Cason et al. (1997). The water loss by pressure was determined intriplicate in five fillets per treatment according to Stadnik et al. (2008).

Comparison was made between fish meat obtained from tilapia being fed a feed comprising a composition of the present invention and fish meat obtained from tilapia being fed a feed without additives.

|  | no additive | additive |
|---|---|---|
| water-holding capacity (%) | 58.88 | 59.10 |
| water loss by pressure (%) | 31.90 | 30.25 |
| water loss during cooking (%) | 22.88 | 21.66 |

From the above results, it can be concluded that tilapia fish being fed a feed comprising a composition according to the present invention, yields fish meat of higher quality in comparison to non-additive fed fish.

Higher meat quality is expressed by a higher water-holding capacity, which implicates a larger sensation of juiciness during chewing of the fish meat, and smaller water loss both under pressure and during cooking.

Example 8 Meat Quality Parameters in Pork Meat

A population of 24 pigs, comprising all female specimen, was selected on a commercial fattening pig farm, and was fed with an animal feed comprising a composition according to the present invention (composition A), wherein said composition was dosed in the feed at a concentration of 0.80 kg/MT of feed. The feed was fed to the pigs once they reached a weight of above 75.0 kg which equals the last 60 days before they were slaughtered.

Measured meat quality parameters comprise (1) ultimate pH, (2) pigmentation, (3) thiobarbituric acid reactive substances (TBARS), and (4) the endogenous anti-oxidative system.

Ultimate pH

The ultimate pH was determined right after taking meat samples. Ultimate pH relates to the conversion of muscle to meat, i.e. how the glycogen reserve is transformed into lactic acid. Comparison was made between meat obtained from pigs being fed a feed comprising a composition of the present invention and meat obtained from pigs being fed a feed without additives.

|  | no additive | additive |
|---|---|---|
| ultimate pH | 5.35 | 5.46 |

Using the composition according to the present invention resulted in an ultimate pH which is within the desired range for tender meat, i.e. between 5.4 and 5.8. An ultimate pH lower than 5.3 could indicate that oxidation has commenced and is undesirable. A pH between 5.8 and 6.2 indicates inconsistencies in tenderness, while a pH of above 6.2 could potentially indicate microbial spoilage or flavor deficiencies.

Pigmentation

Color and color stability based on different values (according to the "Commission Internationale de l'Eclairage (CIE) L*a*b* scales") were measured at different time-points, i.e. at 4 and 10 days after slaughter. A fresh meat sample was exposed to direct light (950 lux) and stored at 2° C., covered with an oxygen permeable foil to prevent dehydration.

The "Commission Internationale de l'Eclairage (CIE) L*a*b* scales" take into account three values, which are L* (lightness), a* (redness) and b* (yellowness). Color stability was expressed through changes in these 3 values, using the formula $\Delta E=\sqrt{(\Delta L^2+\Delta a^2+\Delta b^2)}$.

|  | no additive | additive |
|---|---|---|
| ΔE (day 0-10) | 3.98 | 2.98 |

It was found that ΔE of meat obtained from additive fed animals was 25% lower than ΔE of meat obtained from non-additive fed animals, which indicates a significant improvement in color stability.

Thiobarbituric Acid Reactive Substances (TBARS)

Oxidation causes meat to undergo detrimental changes in pigmentation. Hence, it is very important that the initial color is preserved over time. The smaller the oxidation, the more preserved the color has been. Thiobarbituric acid reactive substances (TBARS) are a measure of the degree of oxidation in meat and fat tissues. The lower the value, the less oxidation the sample has undergone.

|  | no additive | additive |
|---|---|---|
| ΔTBARS (µg/g, day 0-10)* | 1.1 | 0.5 |

*significant difference (p < 0.05)

After 10 days, meat obtained from additive fed animals showed to have undergone half of the oxidation of that of the control group. Concluding, the composition of the present invention protects the meat from deterioration during storage.

Endogenous Anti-Oxidative System

Liver samples were taken in the slaughter line from all animals and stored under frozen conditions until further analysis. Consequently, the endogenous oxidative enzymes were analyzed regarding three markers: (1) superoxide dismutase (SOD), (2) glutathione peroxidase (GPx), and (3) the ratio of reduced to oxidized glutathione (GSH/GSSH).

Reactive oxygen species (ROS) are produced in unstressed and stressed cells. All cells have a well-developed defense system against these ROS, involving both limiting their formation, as well as instituting their removal. Within a cell, superoxide dismutase constitute the first line of defense against ROS. Once peroxides are formed glutathione peroxidase (GPx) on its turn is a major peroxide scavenging enzyme, turning harmful peroxide into water.

Within a cell, superoxide dismutases (SODs) constitute the first line of defense against ROS. As can be concluded from the data shown below, animals fed with the composition of the present invention tended to have a better protection compared to the control animals, when analyzing SOD values in hepatocytes.

Decreased glutathione peroxidase (GPx) activity has been reported in tissues where oxidative stress occurs in several animal models. As can be concluded from the data shown below, animals fed with the composition of the present invention had significantly higher levels of GPx in their hepatocytes, compared to control animals.

When looking at the GSH/GSSG ratio, there is slightly more glutathione available in its reduced form (GSH) compared to its oxidized form (GSSG) in animals fed with the composition of the present invention in comparison to non-additive fed animals. Glutathione in its reduced form (GSH) is a powerful anti-oxidant and becomes oxidized (GSSG) doing so.

|  | no additive | additive |
|---|---|---|
| superoxide dismutase (U/g, SOD) | 412 | 424 |
| gluthatione peroxidase (U/g, GPx)* | 12 | 15 |
| reduced/oxidized glutathione (GSH/GSSH) | 0.004 | 0.005 |

*significant difference (p < 0.05)

In conclusion, all endogenous antioxidants were found in higher amounts within the hepatocytes of the animals fed with the composition of the present invention in comparison to the control group, which indicates that use of the present composition significantly lowers the oxidative stress within animals and therefore has a beneficial effect on meat quality obtained from said animals.

Example 9 Comparison of Live Weight and Warm Carcass Weight Gain

A population of 12 pigs, comprising all female specimen, was selected on a commercial fattening pig farm, and was fed with an animal feed comprising a composition according to the present invention, wherein said composition was dosed in the feed at a concentration of 1.40 kg/MT of feed. The feed was fed to the pigs once they reached a weight of above 79.0 kg which equals the last 35 days before they were slaughtered.

A comparison was made between live weight gain and warm carcass weight gain for both additive fed pigs and non-additive fed pigs.

|  | no additive | additive |
| --- | --- | --- |
| average live weight (kg) | 112.0 | 113.8 |
| average warm carcass weight (kg)* | 92.1 | 94.2 |

*significant difference ($p < 0.05$)

As can be concluded from the above, the average live weight of additive fed pigs in comparison to non-additive fed pigs was 1.8 kg higher. The average warm carcass weight on the other hand, was found to be 2.1 kg higher. As a result, use of a composition of the present invention has the effect of obtaining a warm carcass weight gain which is higher than the average live weight gain. This indicates that the composition has a particularly high effect on meat production yield in comparison to general weight gain.

The invention claimed is:

1. A composition as an additive in a feed for improving slaughtering and/or meat quality parameters of meat obtained from an animal to be consumed, wherein said composition comprises:
   at least one polyphenolic compound comprising;
      a free ortho di- or trihydroxy phenolic acids and an ellagitannin, wherein the free ortho di- or trihydroxy phenolic acid and the ellagitannin are present in the polyphenolic compound at a ratio of about 50:1 to about 1:50.

2. The composition according to claim 1, wherein said at least one polyphenolic compound is a plant polyphenol.

3. The composition according to claim 1, wherein said at least one polyphenolic compound comprises free ortho di- or trihydroxy phenolic acids, ellagitannins, gallic esters, flavonoids, or combinations thereof.

4. The composition according to claim 1, wherein said polyphenolic compound has a content in said composition of between 5.0 and 95.0 wt. %.

5. The composition according to claim 1, wherein said polyphenolic compound comprises free ortho di- or trihydroxy phenolic acids and said free ortho di or trihydroxy phenolic acids have a concentration in said composition of between 0.1 and 80.0 wt. %.

6. The composition according to claim 1, wherein said free ortho di- or trihydroxy phenolic acids are chosen from the group of caffeic acid, rosemarinic acid, carnosic acid, ellagic acid, gallic acid, or combinations thereof.

7. The composition according to claim 1, wherein said composition is dosed in said feed in a concentration of between 0.05 and 1.4 kg/MT.

8. The composition according to claim 1, wherein said animal is selected from the group consisting of pigs, ruminants, crustaceae, fish, or any combinations thereof.

9. The composition according to claim 8, wherein said animal is a pig.

10. The composition according to claim 9, wherein said pig is fed with said feed during the last 10 to 80 days before slaughter.

11. The composition according to claim 10, wherein said pig has a body weight of between 70 kg and 160 kg.

12. The composition according to claim 1, wherein said slaughtering parameters selected from the group consisting of a warm carcass weight, a muscle/bone ratio, a ham weight, a ham angle, a ham width, and any combination thereof.

13. The composition according to claim 1, wherein said meat quality parameters comprise tenderness, flavor, oxidation level, oxidation resistance, drip loss, lean meat content, fat content, pigmentation, ultimate pH, or combinations thereof.

14. A composition as an additive in a feed for improving slaughtering and/or meat quality parameters of meat obtained from an animal to be consumed, wherein said composition comprises:
   at least one polyphenolic compound comprising;
      a free ortho di- or trihydroxy phenolic acids and an ellagitannin, wherein the free ortho di- or trihydroxy phenolic acid and the ellagitannin are present in the polyphenolic compound at a ratio of about 50:1 to about 1:50; and,
      a gallic esters and a flavonoid, wherein the gallic esters and flavonoid are present in the polyphenolic compound at a ratio of about 50:1 to about 1:50.

* * * * *